Feb. 20, 1968  A. SOO  3,369,819
VALVE STEM SEAL
Filed Dec. 10, 1964  2 Sheets-Sheet 2

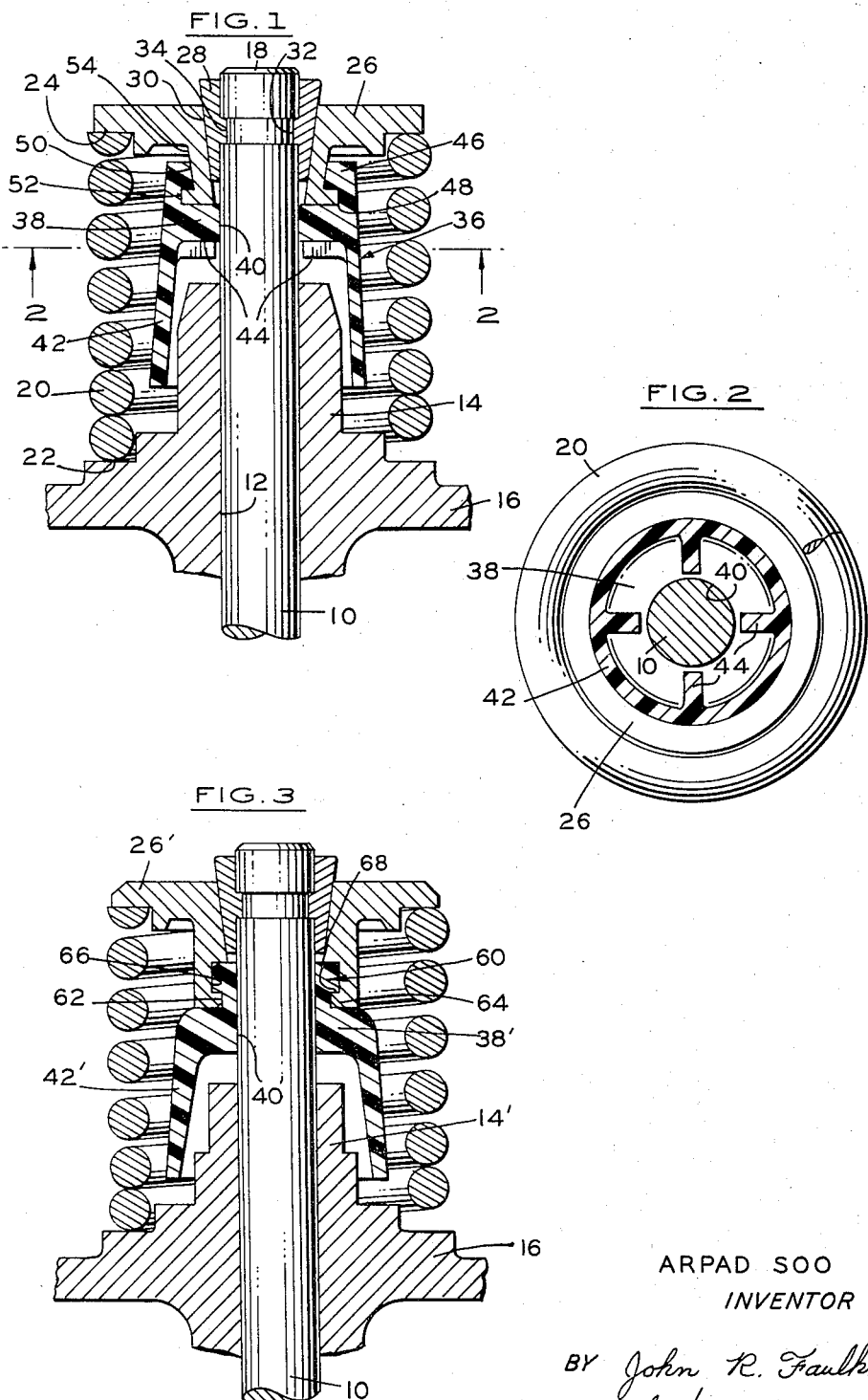

ARPAD SOO
INVENTOR

BY John R. Faulkner
Robert E. McCollum
ATTORNEYS

United States Patent Office 3,369,819
Patented Feb. 20, 1968

3,369,819
VALVE STEM SEAL
Arpad Soo, Dearborn Heights, Mich., assignor to Ford Motor Company, Dearborn, Mich., a corporation of Delaware
Filed Dec. 10, 1964, Ser. No. 417,327
1 Claim. (Cl. 277—178)

This invention relates to the valve train in an internal combustion engine. More particularly, it relates to a valve stem seal for preventing an excessive amount of lubricant being splashed against the stem or leaking down the stem into the valve port and combustion chamber.

The valve train in an internal combustion engine needs some lubrication for proper functioning. However, the valve stem must be protected against a splashing of the oil or lubricant against it or an excessive leakage of oil down the stem and onto the valve seat and face, where it would become carbonized by the high combustion chamber temperature and, therefore, form deposits on the valve seat. This would result in reducing the efficiency of operation and increasing the oil consumption.

One of the objects of the invention, therefore, is to provide a seal for the stem of a valve in an internal combustion engine that insures adequate lubrication of the valve train, but prevents splashing of the lubricant against the valve stem or an excessive leakage of lubricant down the stem toward the valve.

Another object of the invention is to provide a valve stem seal consisting of an elastomeric member that is mechanically locked to one of the valve train parts so as to be operative at all times to prevent excessive lubrication.

A further object of the invention is to provide a valve stem seal that is simple in construction, is dependable in operation, inexpensive to manufacture, and is as insensitive to heat and wear as possible.

Other objects, features and advantages will become apparent upon reference to the succeeding, detailed description of the invention and to the drawings illustrating the preferred embodiments thereof; wherein, FIGURE 1 shows a cross-sectional view of a valve train assembly incorporating one form of seal constructed according to the invention;

FIGURE 2 is a cross-sectional view taken on a plane indicated by and viewed in the direction of the arrows 2—2 of FIGURE 1;

FIGURE 3 shows a cross-sectional view of a modification of the valve stem seal of FIGURE 1; and, FIGURE 4 illustrates a cross-sectional view of another embodiment of the invention.

Figure 4:
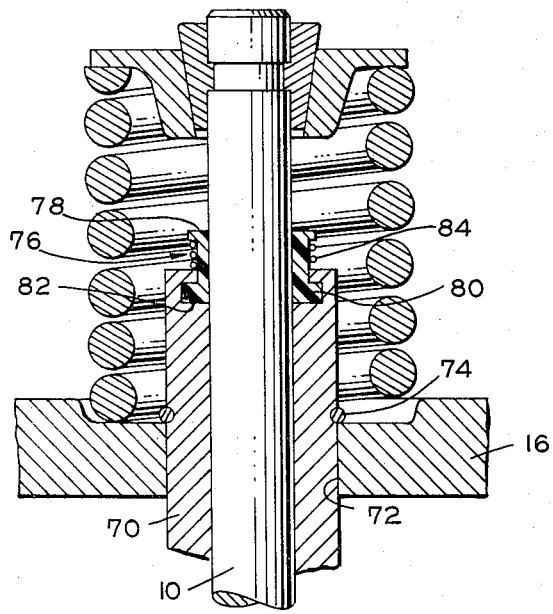

FIGURE 1 shows a valve train assembly that, in general, is of a known commercially available type. It includes a valve stem 10 that slidably projects through the bore 12 of a cylindrical valve guide sleeve 14. The sleeve projects from and is integral with the cylinder head 16 of an internal combustion engine. The opposite end of valve stem 10 is formed with a flat surface 18 adapted to be engaged by a rocker arm or other suitable known means to move the stem downwardly in a known manner. The lower portion of valve stem 10 would be formed integral with the valve so that downward movement of the stem would open the valve.

The valve is biased to a closed position by a spring 20 seated at one end on a shoulder 22 on cylinder head 16, and at its opposite end on a flat annular edge 24 of an annular spring retainer 26. The retainer is fixedly secured to valve stem 10 by a split conical key or valve lock 28 that cooperates with a mating conical opening 30 in retainer 26. The valve lock 28 has internal radial flanges 32 that engage an annular groove 34 in the valve stem. The valve locks are wedged into place between retainer 26 and stem 10 to lock the two securely together in a known manner.

To prevent oil or lubricant that is used to lubricate the various parts of the valve train assembly from being splashed against valve stem 10 and/or leaking down past guide 14 onto the valve head and port, stem 10 is provided with an elastomer seal 36. This seal has an over-all conical shape, although it could be cylindrical. It has an annular main body or base portion 38 provided with an aperture 40 through which valve stem 10 is inserted. The diameter of hole 40 would be slightly less than the diameter of stem 10 so as to provide an interference friction fit or pressfit between the two and thereby assure a unitary movement of the two.

Seal member 36 has a tubular-like skirt portion 42 that depends from base portion 38 and is radially spaced from valve guide 14 in an overlapping manner, as shown. Four equally spaced ribs or webs 44 are provided on the under portion of base 38 to provide rigidity to the seal and skirt.

At its upper end, seal 36 is provided with an annular flange 46 that has an internal annular groove 48. The groove is adapted to receive a radially extending flange 52 formed on the lower portion of retainer 26. It will be apparent from this construction that when the elastomer seal 36 is assembled to retainer 26 that the retainer and upper hook-like portion 46 of the seal will have an interlocking relationship of flange 52 in groove 48 and flange 46 of the seal in a groove 50 formed in the retainer by the lip flange 52.

To assemble the valve train, valve stem 10 would be inserted through bore 12 in the cylinder head 16 and guide 14, and through the hole 40 in the elastomer seal 36. The spring 20 and retainer 26 would then be fitted over stem 10, and the retainer flange 52 pressfitted into groove 48 to interlock the seal and retainer. The valve locks 28 would then be inserted between the retainer and valve stem to wedge them together.

With the construction as described, the seal is secured for movement with both the retainer and valve stem by the interlocking arrangement between the upper portion of the seal member and the retainer, and the pressfit of the seal body portion 38 on stem 10. The skirt portion 42 permits some lubrication of stem 10, but prevents oil from being splashed directly against the valve stem 10, and, therefore, prevents an excessive leakage of oil down the stem past guide 14.

FIGURE 3 shows a modified form of seal. In this figure, the valve train elements are essentially of the same construction as shown in FIGURE 1 except for a slight change in the shape of the valve spring retainer to form the interlocking engagement with the valve stem seal. The seal in this instance again has a main body portion 38′ with a depending skirt portion 40′ overlapping valve guide 14′. The internal surface of skirt portion 40′ in this instance has a slightly greater taper, and tapers with respect to the external surface. The significant differences between the FIGURES 1 and 3 constructions, however, lie in the upper portion of the seal member.

In FIGURE 3, the body portion 38′ is formed integral with an annular boss 60 that has an external annular groove 62. This latter groove receives an internally facing annular flange 64 formed by providing an internal groove 66 on the lower portion of spring retainer 26. Flange 64 and groove 66 thus cooperate with groove 62 and the hook-like edge 68 of the seal in an interlocking manner similar to that shown in FIGURE 1. The internal diameter of boss 60 is bored to the same diameter as the main body portion 38′ and, therefore, has a pressfit with valve stem 10 in the same manner as body portion 38′. The advantage of this design over that of FIGURE 1 is that a greater area of contact is provided between the seal and the valve stem, and a greater sealing force is exerted between the retainer and the upper portion 68 of the seal.

In FIGURE 1, the upper part of seal 38 is clamped onto the lower portion of the retainer 26. In FIGURE 3, the retainer clamps the upper part of the seal onto the valve stem.

FIGURE 4 shows still another form of valve stem seal. In this figure, the valve train assembly is slightly modified. That is, cylinder head 16 is suitably bored to receive a separate valve guide member 70 that is pressfitted within the bore 72. An O-ring seal 74 prevents leakage at the point of juncture within the cylinder head. The elastomer seal 76 in this case is fixedly secured to valve guide member 70, and the valve stem 10 is slidable through the seal.

More specifically, the seal comprises a substantially tubular elastomeric member surrounding valve stem 10 with a close sealing fit. It has upper and lower radial flanges 78 and 80. Lower flange 78 is assembled into an internal annular groove 82 in valve guide 70 to provide an interlocking engagement with the valve guide in a manner similar to that described in connection with the FIGURES 1 and 3 construction. The seal is pressed against valve stem 10 by a spring 74 surrounding the seal and seated between the adjacent faces of flanges 78 and 80.

In operation, the radial movement of valve stem 10 to open or close the valve will slide the stem relative to the fixed seal 76. The force of spring 84, however, and the slightly smaller internal diameter of the sleeve seal maintains the elastomeric member in sealing contact with the valve stem.

In each of the forms shown in FIGURES 1, 2 and 3, 4 the seal is made from a suitable elastomer, plastic or elastic material so that is can deform slightly under the pressures caused by the interlocking engagements shown in each of the figures and also the spring force shown in FIGURE 3 to maintain a sealing engagement with the valve stem at all times.

From the foregoing, it will be clear that the invention provides a valve stem seal that is simple in construction, inexpensive to manufacture, and is dependable at all times to prevent excessive lubrication of the valve stem. It, therefore, extends the wear and life expectancy of the engine by preventing excessive carbon deposits on the valve seat and head by leakage of oil past the valve stem and guide.

While the invention has been illustrated in its preferred embodiments in the figures, it will be clear to those skilled in the arts to which the invention pertains that many changes and modifications may be made thereto without departing from the scope of the invention.

What is claimed is:

1. A valve stem seal for use in a valve train assembly having a valve spring retainer element secured by a valve lock element to a valve stem slidable in a valve guide element, said seal comprising, an elastomeric member having a radially extending base portion sealingly surrounding and engaging said stem for movement therewith and a skirt portion radially spaced from and overlapping said guide element and extending axially in one direction from one side of said base portion, and means providing an interlocking engagement between said member and one of said elements, said means comprising an annular flange integral with and extending axially in the opposite direction from the other side of said base portion and having a hook-like portion, said hook-like portion having flat radial and axial surfaces respectively engaging corresponding surfaces of a matingly shaped portion of one of said elements.

References Cited
UNITED STATES PATENTS

| | | | |
|---|---|---|---|
| 2,124,702 | 7/1938 | Jacoby | 123—188 |
| 2,822,796 | 2/1958 | Niess | 123—188 |
| 2,876,759 | 3/1959 | Duesenberg | 123—188 |
| 3,069,175 | 12/1962 | Skinner | 277—98 X |
| 3,110,298 | 11/1963 | Giles | 123—188 |

LAVERNE D. GEIGER, *Primary Examiner.*

J. S. MEDNICK, *Assistant Examiner.*